(12) United States Patent
Nojiri et al.

(10) Patent No.: US 10,953,896 B2
(45) Date of Patent: Mar. 23, 2021

(54) SELF-POSITION CORRECTION METHOD AND SELF-POSITION CORRECTION DEVICE FOR DRIVE-ASSISTED VEHICLE

(71) Applicant: Nissan Motor Co., Ltd., Yokohama (JP)

(72) Inventors: Takahiro Nojiri, Kanagawa (JP); Tatsuya Shino, Kanagawa (JP); Katsuhiko Degawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/626,379

(22) PCT Filed: Jul. 27, 2017

(86) PCT No.: PCT/JP2017/027257
§ 371 (c)(1),
(2) Date: Dec. 24, 2019

(87) PCT Pub. No.: WO2019/021421
PCT Pub. Date: Jan. 31, 2019

(65) Prior Publication Data
US 2020/0377117 A1    Dec. 3, 2020

(51) Int. Cl.
*B60W 60/00* (2020.01)
*B60W 30/12* (2020.01)
(Continued)

(52) U.S. Cl.
CPC .......... *B60W 60/001* (2020.02); *B60W 30/12* (2013.01); *B60W 30/18163* (2013.01);
(Continued)

(58) Field of Classification Search
CPC .............. B60W 60/001; B60W 30/12; B60W 30/18163; B60W 50/14; G01C 21/30; G05D 1/0088; G05D 2201/0213
See application file for complete search history.

(56) References Cited

U.S. PATENT DOCUMENTS

2017/0097642 A1   4/2017   Okuya et al.
2017/0122754 A1*  5/2017   Konishi .......... B60W 30/18154

FOREIGN PATENT DOCUMENTS

CN    101346603 A    1/2009
CN    105489035 A    4/2016
(Continued)

*Primary Examiner* — Michael D Lang
(74) *Attorney, Agent, or Firm* — Global IP Counselors, LLP

(57) ABSTRACT

In lane selection control in which a lane in which a host vehicle travels is selected based on the map information and information acquired by an external sensor that acquires periphery information of the host vehicle, a self-position correction object in an intended travel route is identified based on the map information. When the host vehicle reaches a correction point where the self-position correction object is present, a determination is made as to whether or not the self-position correction object can be recognized by the external sensor from the lane in which the host vehicle travels. Upon determined that the self-position correction object cannot be recognized from the center lane in which the host vehicle travels, a lane change to a leftmost lane where the self-position correction object can be recognized is made before the host vehicle reaches the correction point.

8 Claims, 10 Drawing Sheets

(51) Int. Cl.
*B60W 30/18* (2012.01)
*B60W 50/14* (2020.01)
*G01C 21/30* (2006.01)
*G05D 1/00* (2006.01)

(52) U.S. Cl.
CPC ............ *B60W 50/14* (2013.01); *G01C 21/30* (2013.01); *G05D 1/0088* (2013.01); *G05D 2201/0213* (2013.01)

(56) References Cited

FOREIGN PATENT DOCUMENTS

| | | | |
|---|---|---|---|
| CN | 106767853 A | 5/2017 | |
| CN | 106842269 A | 6/2017 | |
| DE | 199 21 437 A1 | 11/2000 | |
| DE | 19921437 C2 | 5/2001 | |
| EP | 2 019 288 A1 | 1/2009 | |
| JP | 2005-257314 A | 9/2005 | |
| JP | 2012-122760 A | 6/2012 | |
| JP | 2014-134469 A | 7/2014 | |
| JP | 2017-58235 A | 3/2017 | |
| KR | 10-2006-0132302 A | 12/2006 | |
| KR | 10-2013-0010718 A | 1/2013 | |
| WO | 2016/203515 A1 | 12/2016 | |

\* cited by examiner

SELF-POSITION CORRECTION METHOD AND SELF-POSITION CORRECTION DEVICE FOR DRIVE-ASSISTED VEHICLE

CROSS-REFERENCE TO RELATED APPLICATIONS

This application is a U.S. national stage application of International Application No. PCT/JP2017/027257, filed on Jul. 27, 2017.

BACKGROUND

Technical Field

The present invention relates to a self-position correction method and a self-position correction device for a drive-assisted vehicle.

Background Information

In the prior art, there are known self-position correction methods in which a distance from a host vehicle to a signboard or another correction object present on a travel route is used when a position of a host vehicle (self-position) on a map is to be corrected (for example, see Japanese Laid-Open Patent Application No. 2014-134469-Patent Citation 1).

SUMMARY

However, in these prior self-position correction methods, a position of a correction object is identified based on an image photographed by a camera installed in the host vehicle, and a distance to the correction object is measured. Therefore, when the correction object cannot be appropriately photographed, a problem is encountered in that self-position correction cannot be performed and a correction opportunity is lost.

The present invention was devised with focus on the problem described above, it being an object of the invention to provide a self-position correction method and a self-position correction device for a drive-assisted vehicle that increase the number of opportunities to correct a self-position on a map can be increased.

To achieve the object described above, the present invention is a self-position correction method for a drive-assisted vehicle comprising an onboard sensor that acquires information about a periphery of a host vehicle, and a controller that selects a lane in which the host vehicle travels based on information acquired by the onboard sensor and map information and corrects a self-position on a map. In lane selection control in which the lane in which the host vehicle travels is selected, first, a self-position correction object in an intended travel route is identified based on the map information. Next, when the host vehicle reaches a correction point where the identified self-position correction object is present, a determination is made as to whether or not the self-position correction object can be recognized by the onboard sensor from the lane in which the host vehicle travels. Then, when it is determined that the self-position correction object cannot be recognized from the lane in which the host vehicle travels, a lane change to a lane where the self-position correction object can be recognized is made before the host vehicle reaches the correction point.

Consequently, in the present invention, opportunities to correct a self-position on a map can be increased in number.

DETAILED DESCRIPTION OF THE EMBODIMENTS

Figure 1:
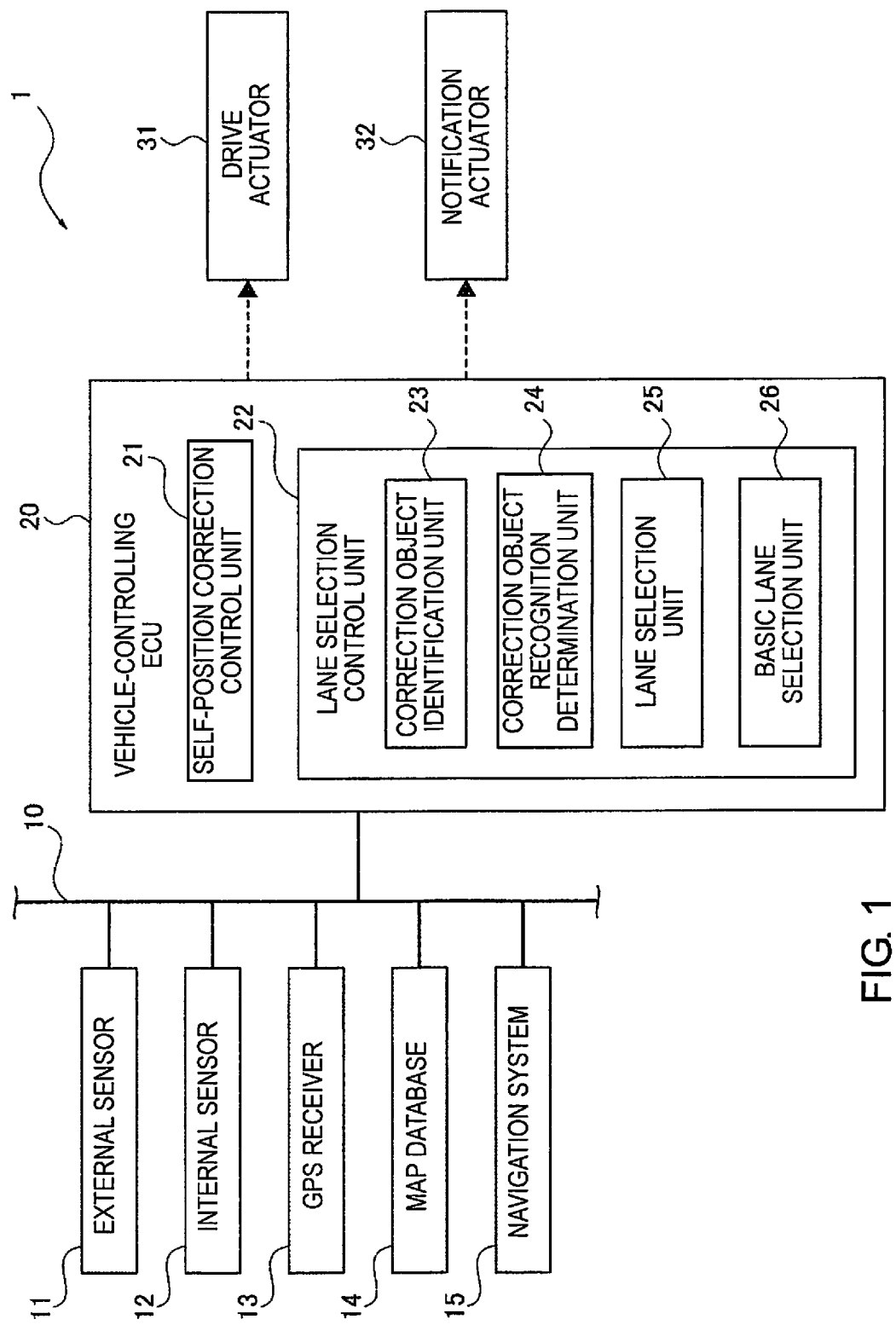
FIG. 1 is an overall system configuration diagram of a self-position correction system of the first embodiment.

A preferred embodiment for carrying out the method and self-position correction device for a drive-assisted vehicle of the present invention is described below based on the first embodiment shown in the drawings.

First Embodiment

First, the configuration shall be described. The self-position correction method and self-position correction device in the first embodiment are applied to a drive-assisted vehicle which is equipped with a self-position correction system that corrects a position of a host vehicle on a map while the vehicle is traveling, and which is capable of autonomous driving in which a lane change is autonomously carried out so as to follow a target lane. The description of the configuration of the first embodiment below is divided into "Overall system configuration of the self-position correction system," "Detailed configuration of the lane selection control unit," "Configuration of the position correction assistance control process," "Configuration of the self-position correction control process," and "Configuration of the basic lane selection control process."

Overall System Configuration of the Self-Position Correction System

A self-position correction system 1 of the first embodiment is provided with an external sensor 11, an internal sensor 12, a GPS receiver 13, a map database 14, and a navigation system 15, as shown in FIG. 1. The system is further provided with a vehicle-controlling ECU 20, a drive actuator 31, and a notification actuator 32.

The external sensor 11 is provided to a host vehicle, and is a sensor (onboard sensor) for acquiring information on a periphery of the host vehicle during travel. The external sensor 11 of the first embodiment is a commonly used stereo camera. The stereo camera that is the external sensor 11 has a photographing range (range of recognition) capable of photographing a total of four white lines, two each at most on the left and right sides centered about the host vehicle. The information on the periphery of the host vehicle acquired by the external sensor 11 is outputted to the vehicle-controlling ECU 20 and the navigation system 15 via a CAN communication line 10. Instead of a stereo camera, the external sensor 11 can be Clearance Sonar using ultrasonic waves, a laser range finder using an infrared laser, etc.

The internal sensor 12 is provided to the host vehicle, and is a sensor for detecting a traveling state of the host vehicle. In this embodiment, the internal sensor 12 is a vehicle speed sensor, a yaw angle sensor, a steering angle sensor, etc. Host vehicle information acquired by the internal sensor 12 is outputted to the vehicle-controlling ECU 20 and the navigation system 15 via the CAN communication line 10.

The GPS receiver 13 receives signals from three or more GPS satellites, extracts data needed for positioning relying on these signals, and acquires GPS information indicating the position of the host vehicle. The GPS information acquired by the GPS receiver 13 is outputted to the vehicle-controlling ECU 20 and the navigation system 15 via the CAN communication line 10.

The map database 14 is stored in onboard memory (not shown), and is a database provided with map information into which is written: travel information, such as slope and speed limit; road periphery information, such as signs, telephone poles, and structures (tunnels, bridges, pedestrian overpasses, etc.); and indicator information, such as white lines and stop lines. The information of the map database 14 is referenced from the vehicle-controlling ECU 20 and the navigation system 15 via the CAN communication line 10.

The navigation system 15 estimates the position of the host vehicle (self-position) on the map using various items of information inputted from the external sensor 11, the internal sensor 12, the GPS receiver 13, and the map database 14. Based on the estimated self-position information, destination information set on the map by a driver of the host vehicle, etc., an intended travel route to a destination is generated. Furthermore, guidance for the generated intended travel route is given to the driver. Travel route information and self-position information generated by the navigation system 15 are outputted to the vehicle-controlling ECU 20 via the CAN communication line 10.

The vehicle-controlling ECU 20 (controller) is an integrated controller that uses various items of information inputted from the external sensor 11, the internal sensor 12, the GPS receiver 13, the map database 14, the navigation system 15, and the onboard memory (not shown) to output a control command for causing the host vehicle to travel along the intended travel route. The control command outputted from the vehicle-controlling ECU 20 is inputted to the drive actuator 31 or the notification actuator 32 as necessary. The vehicle-controlling ECU 20 has a self-position correction control unit 21 and a lane selection control unit 22.

Using the various items of information inputted from the external sensor 11, the internal sensor 12, the GPS receiver 13, the map database 14, the navigation system 15, and the onboard memory, the self-position correction control unit 21 performs self-position correction control in which the self-position estimated by the navigation system 15 is corrected. In this self-position correction control, a determination is made as to whether or not a self-position correction object (for example, a white line having a point of changing curvature) can be recognized based on an image photographed by the external sensor 11, which is a stereo camera. When a self-position correction object can be recognized, the self-position correction object (first white line) recognized based on the image photographed by the external sensor 11 and the self-position correction object (second white line) identified based on the map database 14 are matched. The self-position on the map is then corrected based on position deviation information obtained as a result of this matching. This self-position correction is executed at prescribed intervals (in this embodiment, every time the vehicle travels a certain distance). However, when self-position correction cannot be performed, the travel distances of the sections during which self-position correction could not be performed are added up. When this cumulative distance exceeds a prescribed value, lane selection control by the lane selection control unit 22 is carried out.

The lane selection control unit 22 performs a basic lane selection control, which selects a basic lane over which the host vehicle travels in a basic manner, based on various items of information inputted from the external sensor 11 and the internal sensor 12 and travel route information inputted from the navigation system 15. The lane selection control unit 22 also performs the lane selection control in which a self-position correction object ahead along the path of travel is identified based on map information obtained by referencing the map database 14, a determination is made as to whether or not a lane change for recognizing this self-position correction object is needed, and a lane change is performed as necessary.

The drive actuator 31 comprises various actuators that drive an accelerator pedal, a brake, and a steering wheel, which operate the vehicle based on the travel control command.

The notification actuator 32 is an actuator to which a notification control command is inputted when a lane change is autonomously made in accordance with the lane selection control performed by the lane selection control unit 22, and which notifies the driver that a lane change will be made (the fact that a lane change will be made, the reason for making the lane change, etc.) based on this notification control command. In this embodiment, the notification device is a speaker capable of outputting any sounds.

Detailed Configuration of the Lane Selection Control Unit

The lane selection control unit 22 of the first embodiment has a correction object identification unit 23, a correction object recognition determination unit 24, a lane selection unit 25, and a basic lane selection unit 26, as shown in FIG. 1.

The correction object identification unit 23 references the map database 14 and acquires map information. Travel route information is also acquired from the navigation system 15. Based on the map information and the travel route information, the correction object identification unit 23 looks up a self-position correction object in an intended travel route and identifies a self-position correction object present within a prescribed range of which the host vehicle is a reference. In this embodiment, "self-position correction object"

denotes an object to be used as a measurement standard for a position deviation amount when the position of the host vehicle on the map is corrected. This self-position correction object is, for example, a white line having a prescribed point of changing curvature within the prescribed range, a sign, etc.

When the host vehicle has reached a correction point where the self-position correction object identified by the correction object identification unit 23 is present, the correction object recognition determination unit 24 determines whether or not the self-position correction object can be recognized by the external sensor 11 from the lane in which the host vehicle is currently traveling (current lane). Specifically, when the host vehicle has reached the correction point without making a lane change, a determination is made as to whether or not the self-position correction object can be recognized based on the image photographed by the external sensor 11. The correction object recognition determination unit 24 makes the determination described above based on the photograph range (range of recognition) of the external sensor 11 and the map information. "Correction point" denotes an area of the prescribed range including the position where the self-position correction object is present.

When the correction object recognition determination unit 24 has determined that the self-position correction object cannot be recognized from the current lane when the correction point is reached, the lane selection unit 25 outputs a travel control command to make a lane change to a lane from which the self-position correction object can be recognized before the host vehicle reaches the correction point. When the correction object recognition determination unit 24 has determined that the self-position correction object can be recognized from the current lane when the correction point is reached, the lane selection unit 25 outputs a travel control command to maintain travel on the traffic lane during the current traveling. These travel control commands are inputted to the drive actuator 31. Furthermore, when outputting a travel control command to make a lane change to a traffic lane from which the self-position correction object can be recognized, the lane selection unit 25 outputs, via a notification device, a notification control command to notify the driver that a lane change will be made. This notification control command is inputted to the notification actuator 32.

The basic lane selection unit 26 selects a traveled-on lane on a road having a plurality of lanes, and outputs a travel control command to travel on the selected lane. This travel control command is inputted to the drive actuator 31.

In the basic lane selection unit 26 this embodiment, a lane that follows the intended travel route acquired from the navigation system 15 is selected as a target lane, and a travel control command to travel on this target lane is outputted. For example, when the host vehicle is traveling in the middle lane of a three-lane road and the intended travel route branches to the left, the host vehicle must travel on the left lane before the branching point. In this case, the left lane is selected as the target lane and a travel control command to make a lane change to this target lane (left lane) is outputted.

In this basic lane selection unit 26, when the host vehicle is traveling on an express lane (a lane selected in order to pass a forward vehicle), a travel lane adjacent to this passing lane is selected as the target lane, and a travel control command to change lanes to this target lane (travel lane) is outputted. When, for example, it is understood that another vehicle will be passed while traveling on the leftmost lane of a three-lane road, the lane on which the pass is made is also a travel lane. Therefore, control that would restore the travel lane to the original lane is not performed, and a travel control command to continue travel on the currently traveled-on lane is outputted.

Furthermore, in this basic lane selection unit 26, a passing lane when another vehicle ahead of the host vehicle is to be passed is selected as the target lane, and a travel control command to change lanes to this target lane (passing lane) is outputted. The determination criterion for whether passing is possible is that a right lane be present, adjacent to the lane in which the host vehicle is currently traveling (current lane), and that another vehicle, of which the speed relative to the speed of the host vehicle is equal to or less than a threshold speed, be ahead of the current lane. In such instances, the right lane is selected as the target lane and a travel control command to change lanes to this target lane (right lane) is outputted.

Configuration of the Position Correction Assistance Control Process

Figure 2:
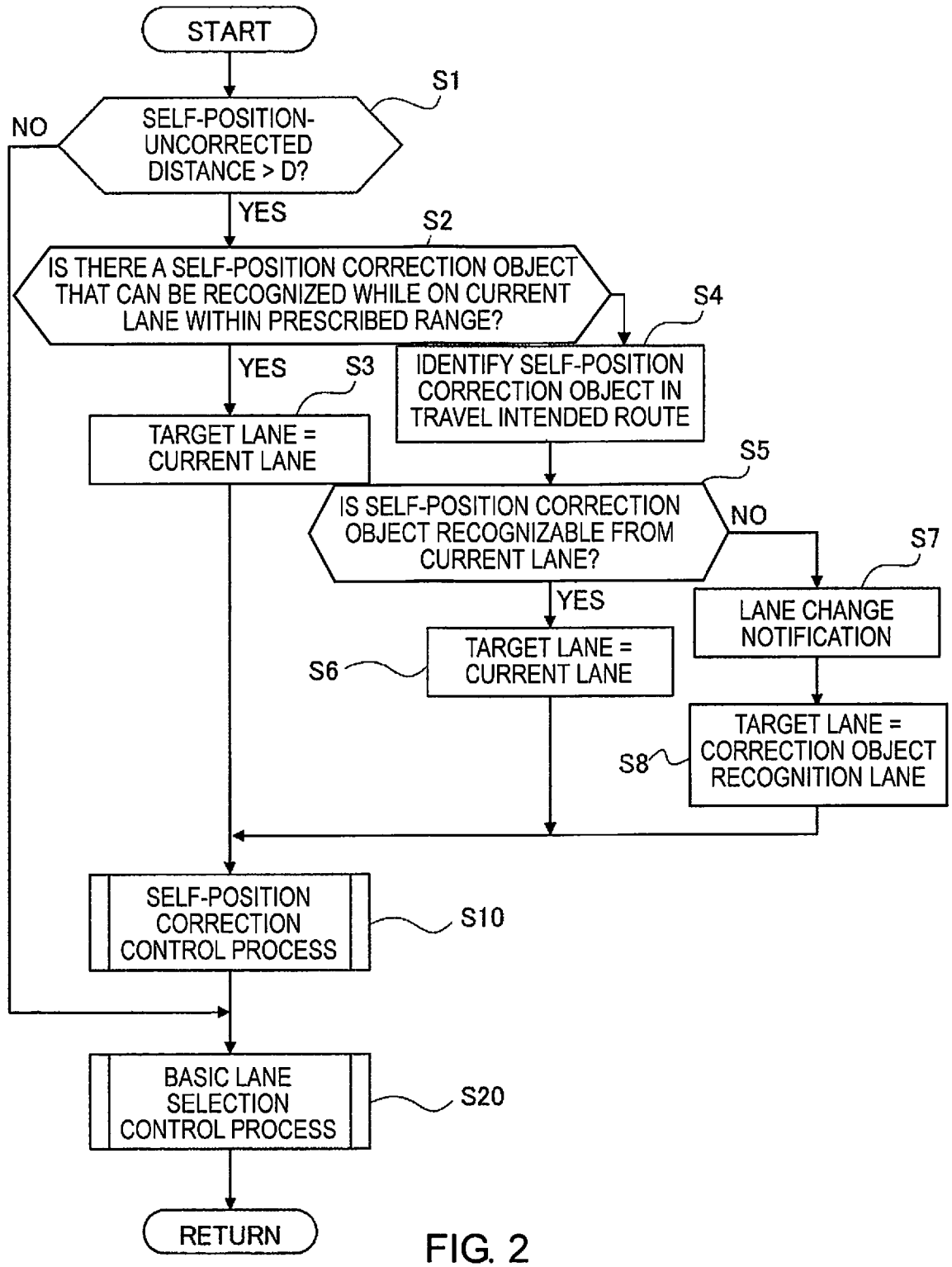
FIG. 2 is a flowchart of a flow of a position correction assistance control process executed by a vehicle-controlling ECU of the first embodiment.

FIG. 2 is a flowchart showing a flow of a position correction assistance control process executed by the vehicle-controlling ECU of the first embodiment. The position correction assistance control process of the first embodiment is described below based on FIG. 2.

In step S1, a determination is made as to whether or not a self-position-uncorrected distance, which is recorded in the onboard memory, exceeds a pre-set threshold distance D[km]. When the determination is YES (self-position-uncorrected distance >D[km]), the process advances to step S2. When the determination is NO (self-position-uncorrected distance ≤D[km]), self-position-uncorrected distances are added up and recorded in the onboard memory on the premise that any error in the self-position on the map is small and a self-position correction is unnecessary, the time is updated, after which the process advances to step S20.

In this step, "self-position-uncorrected distance" denotes a distance traveled since the most recent correction of the self-position on the map was made, and is calculated according to formula (1) below. This "self-position-uncorrected distance" continues to be retained while the vehicle is traveling, and is reset when a correction is made.

$$\text{self-position-uncorrected distance} = \text{self-position-uncorrected distance} + \text{vehicle speed} \times (\text{current time} - \text{most recent time}) \quad (1)$$

The threshold distance D[km] is a distance at which an error in a self-position estimation, the self-position having been estimated based on the vehicle speed and yaw rate, is determined to exceed a prescribed value, and is set based on experimentation, etc.

In step S2, in continuation from the determination in step S1 that the self-position-uncorrected distance is greater than D[km], a determination is made, on the premise that self-position correction is needed, as to whether or not there is a self-position correction object that can be recognized by the external sensor 11 even during travel in the lane in which the host vehicle is currently traveling (current lane) is maintained within a prescribed distance X[m] on the intended travel route ahead of the host vehicle. When the determination is YES (there is a self-position correction object), the process advances to step S3. When the determination is NO (there is no self-position correction object), the process advances to step S4.

In this embodiment, whether or not there is a self-position correction object is determined based on the map information written into the map database 14, and the travel route information of the host vehicle acquired from the navigation system 15. Additionally, whether or not a self-position correction object can be recognized while travel on the current lane is maintained is determined based on the self-position information of the host vehicle acquired from the navigation system 15 and the area of recognition the external sensor 11. "Prescribed distance X[m]" denotes a distance at which a state of correction not being actively made can be allowed even if the self-position-uncorrected distance exceeds the threshold distance D[km], e.g., a distance equal to half the threshold distance D[km].

In step S3, in continuation from the determination in step S2 that there is a self-position correction object that can be recognized while maintaining travel in the current lane within the prescribed distance, a travel control command to maintain travel in the lane in which the host vehicle is currently traveling (current lane) is outputted on the premise that if travel in the current lane is continued, the self-position correction object will be recognizable until the prescribed distance X[m] ahead of the host vehicle is traveled, and the process advances to step S10. The target lane is thereby set to the current lane and travel in the current lane is continued.

In step S4, in continuation from the determination in step S2 that there is no self-position correction object that can be recognized while maintaining travel in the current lane within the prescribed distance, a self-position correction object that is in the intended travel route ahead of the host vehicle and is present in a position nearest to the host vehicle is identified, and the process advances to step S5. In this embodiment, the self-position correction object is identified based on the map information written into the map database 14 and the travel route information of the host vehicle acquired from the navigation system 15. Additionally, the range in which the self-position correction object is looked up at this time is the range of the entire route from the current location of the host vehicle to the destination.

In step S5, in continuation from the identification of the self-position correction object in step S4, a determination is made as to whether or not the self-position correction object can be recognized from the lane on which the host vehicle is currently traveling (current lane), at the time point when the host vehicle reaches the correction point where the self-position correction object identified in step S4 is present. When the determination is YES (recognition is possible), the process advances to step S6. When the determination is NO (recognition is not possible), the process advances to step S7. In this embodiment, "correction point" denotes an area of a prescribed range including the position where the self-position correction object is present. Additionally, whether or not the current lane is a lane from which the self-position correction object can be recognized is determined based on the self-position information of the host vehicle acquired from the navigation system 15 and the area that can be recognized by the external sensor 11.

In step S6, in continuation from the determination in step S5 that the self-position correction object can be recognized from the current lane at the time point of reaching the correction point, a travel control command to maintain travel in the lane (host traffic lane) in which the host vehicle is currently traveling is outputted on the premise that the self-position correction object can be recognized even if travel in the current lane is continued, and the process advances to step S10. Specifically, in step S6, the self-position correction object is determined to be recognizable from the current lane due to the host vehicle continuing to travel in the current lane even past a prescribed distance X[m] ahead of the host vehicle, even though there is no self-position correction object that can be recognized while travel is maintained in the current lane within the prescribed distance X[m]. The target lane is thereby set to the current lane and travel in the current lane is continued.

In step S7, in continuation from the determination in step S5 that the self-position correction object cannot be recognized from the current lane at the time point of reaching the correction point, a notification control command is outputted via a notification device to notify the driver that a lane change will be made to a lane (correction object recognition lane) from which the self-position correction object can be recognized, on the premise that the self-position correction object cannot be recognized should travel in the current lane be continued, regardless of the self-position correction object being in the intended travel route, and the process advances to step S8. In this embodiment, when the notification device is a speaker that outputs sounds, the notification device uses sounds to notify the driver that a lane change will be made and also to notify the driver of the reason for doing so.

In step S8, in continuation from the notification of a lane change in step S7, a travel control command to change lanes to a lane from which the self-position correction object can be recognized (correction object recognition lane) is outputted, and the process advances to step S10. The target lane is thereby set to the correction object recognition lane and the host vehicle changes lanes. In this embodiment, a determination of whether or not a lane change can be executed is made based on the periphery information of the host vehicle acquired by the external sensor 11 and the host vehicle information acquired by the internal sensor 12. When a lane change cannot be executed within a prescribed amount of time due to, inter alia, the effects of the environment surrounding the host vehicle, the lane change execution is halted and the process returns to step S1.

In step S10, in continuation from the outputting of either the travel control command with the current lain maintenance in step S3 or step S6, or the travel control command with the lane change in step S8, a self-position correction control process for correcting the position of the host vehicle on the map is executed, and the process advances to step S20. The self-position correction control process in step S10 is a process of matching periphery information of the host vehicle acquired by the external sensor 11 and periphery information of the host vehicle obtained from the map database 14, and correcting the self-position on the map based on the result. The details of this self-position correction control process are described hereinafter.

In step S20, in continuation from the execution of the self-position correction control process in step S10, a basic lane selection control process of selecting a lane for travel after the self-position correction is executed, and the process advances to RETURN. In the basic lane selection control process in step S20, which lane to travel on is selected based on three standpoints: a lane selection needed in order to follow the intended travel route, a lane selection for returning from the passing lane to the travel lane, and a lane selection needed in order to pass the forward vehicle. When a lane change is not determined to be necessary by any of these standpoints, travel in the lane occupied during the current traveling is maintained and an unnecessary lane change is not made. The details of this basic lane selection control process are described hereinafter.

The process from step S4 to step S8 in the position correction assistance control process shown in FIG. 2 is equivalent to the "lane selection control" in which the lane in which the host vehicle travels is selected based on the information acquired by the external sensor 11 and the map information of the map database 14. In other words, in this position correction assistance control process, the self-position correction control process is executed and the self-position on the map is corrected after the "lane selection control" has been executed.

Configuration of the Self-Position Correction Control Process

Figure 3:
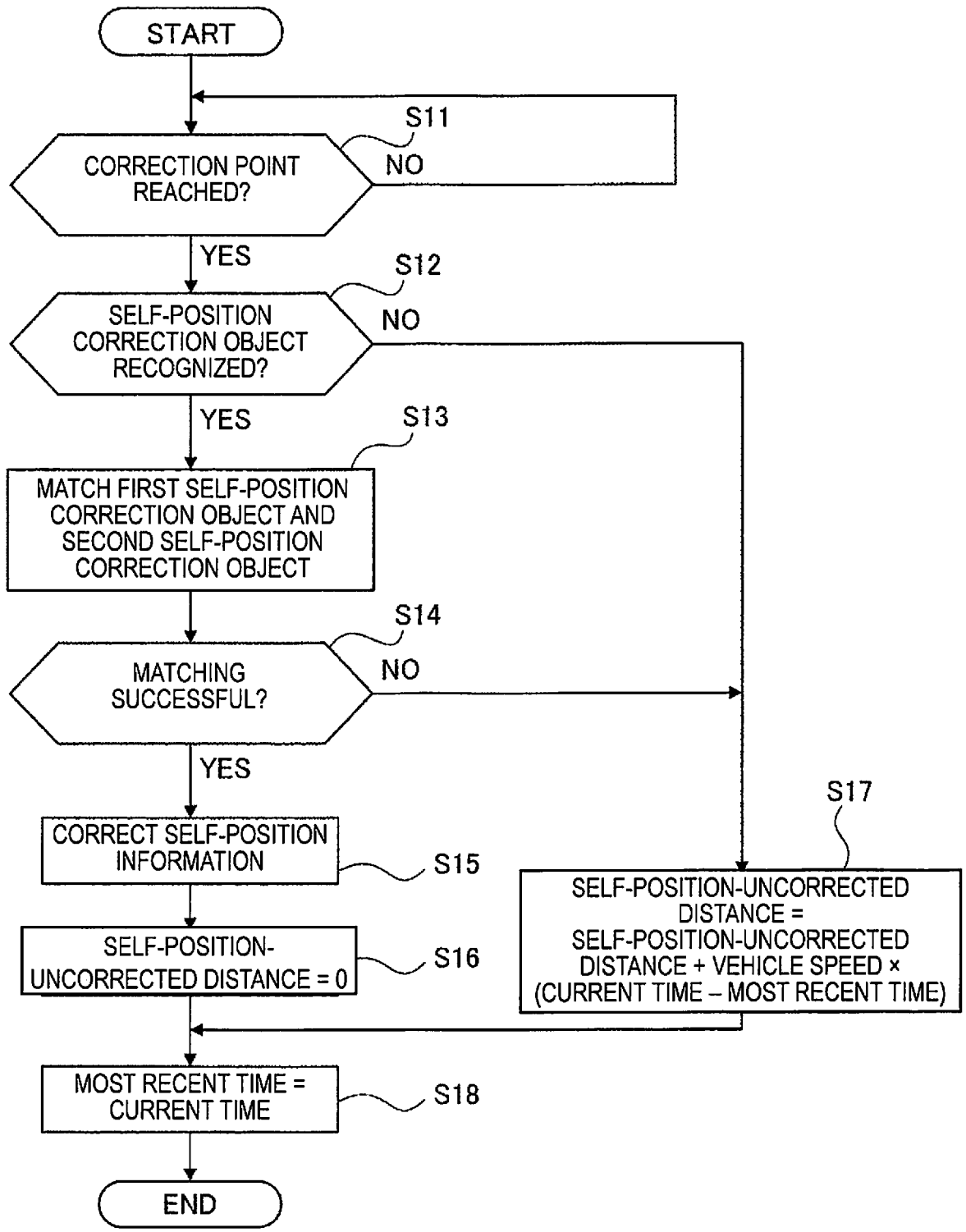
FIG. 3 is a flowchart of a flow of a self-position correction control process executed by the vehicle-controlling ECU of the first embodiment.

FIG. 3 is a flowchart showing a flow of a self-position correction control process executed by the vehicle-controlling ECU of the first embodiment. The self-position correction control process of the first embodiment is described below based on FIG. 3.

In step S11, a determination is made as to whether or not the host vehicle has reached the correction point. When the determination is YES (the point has been reached), the process advances to step S12. When the determination is NO (the point has not been reached), the self-position-uncorrected distances are added up and recorded in the onboard memory, the time is updated, and step S11 is then repeated. In this embodiment, whether or not the correction point has been reached is determined based on the map information acquired from the map database 14 and the self-position information of the host vehicle acquired from the navigation system 15.

In step S12, in continuation from the determination in step S11 that the correction point has been reached, a determination is made as to whether or not a self-position correction object has been recognized based on the sensor information from the external sensor 11. When the determination is YES (recognized), the process advances to step S13. When the determination is NO (recognition is not possible), the process advances to step S17. In this embodiment, whether or not recognition was possible is determined according to the procedure described below when the self-position correction object is, for example, a white line. Specifically, first, the view ahead of the vehicle is photographed by the external sensor 11, which is a stereo camera. The white line (the self-position correction object) present ahead of the vehicle is then detected from acquired image information. Next, based on the image information, curvatures of a plurality of points set on the detected white line are measured based on the image information. When there is a group of measurement points for which a difference in the curvatures of these points is greater than a prescribed value K, it is determined that a self-position correction object could be recognized.

In step S13, in continuation from the determination in step S2 that a self-position correction object was recognized, a first self-position correction object recognized based on the image photographed by the external sensor 11 and a second self-position correction object identified based on the map database 14 are matched, and the process advances to step S14.

In step S14, in continuation from the execution of matching in step S13, a determination is made as to whether or not the matching was successful. When the determination is YES (matching succeeded), the process advances to step S15. When the determination is NO (matching failed), the process advances to step S17. In this embodiment, whether or not matching succeeded is determined based on whether or not a position deviation amount (an amount of deviation between the position of the self-position correction object obtained from the image information and the position of the self-position correction object obtained from the map information) obtained as a result of the matching falls within a prescribed range. The position deviation amount can be estimated in accordance with the travel distance and travel time during which position correction was not being performed. Therefore, when the position deviation amount is outside of the prescribed range, matching can be determined to have failed.

In step S15, in continuation from the determination in step S14 that matching had failed, the self-position is corrected so that the position deviation amount is zero, based on position deviation information obtained as a result of the matching, and the process advances to step S16. The new self-position information after the correction is inputted to the navigation system 15.

In step S16, in continuation from the correction to the self-position information in step S15, the self-position-uncorrected distance is rewritten as "zero" and stored in the onboard memory, and the process advances to step S18.

In step S17, in continuation from the determination in step S12 that a self-position correction object cannot be recognized, or the determination in step S14 that matching failed, on the premise that a correction to the self-position information could not be appropriately made, the self-position-uncorrected distances are added up and recorded in the onboard memory, the time is updated, and the process advances to step S18. In this embodiment, a new cumulative value for the self-position-uncorrected distance is calculated according to the formula (1) given above, and is updated.

In step S18, in continuation from the setting to zero of the self-position-uncorrected distance in step S16 or the updating of the self-position-uncorrected distance in step S17, the time recorded as the most recent time is rewritten as the current time and recorded in the onboard memory, and the process advances to END.

Configuration of the Basic Lane Selection Control Process

Figure 4:
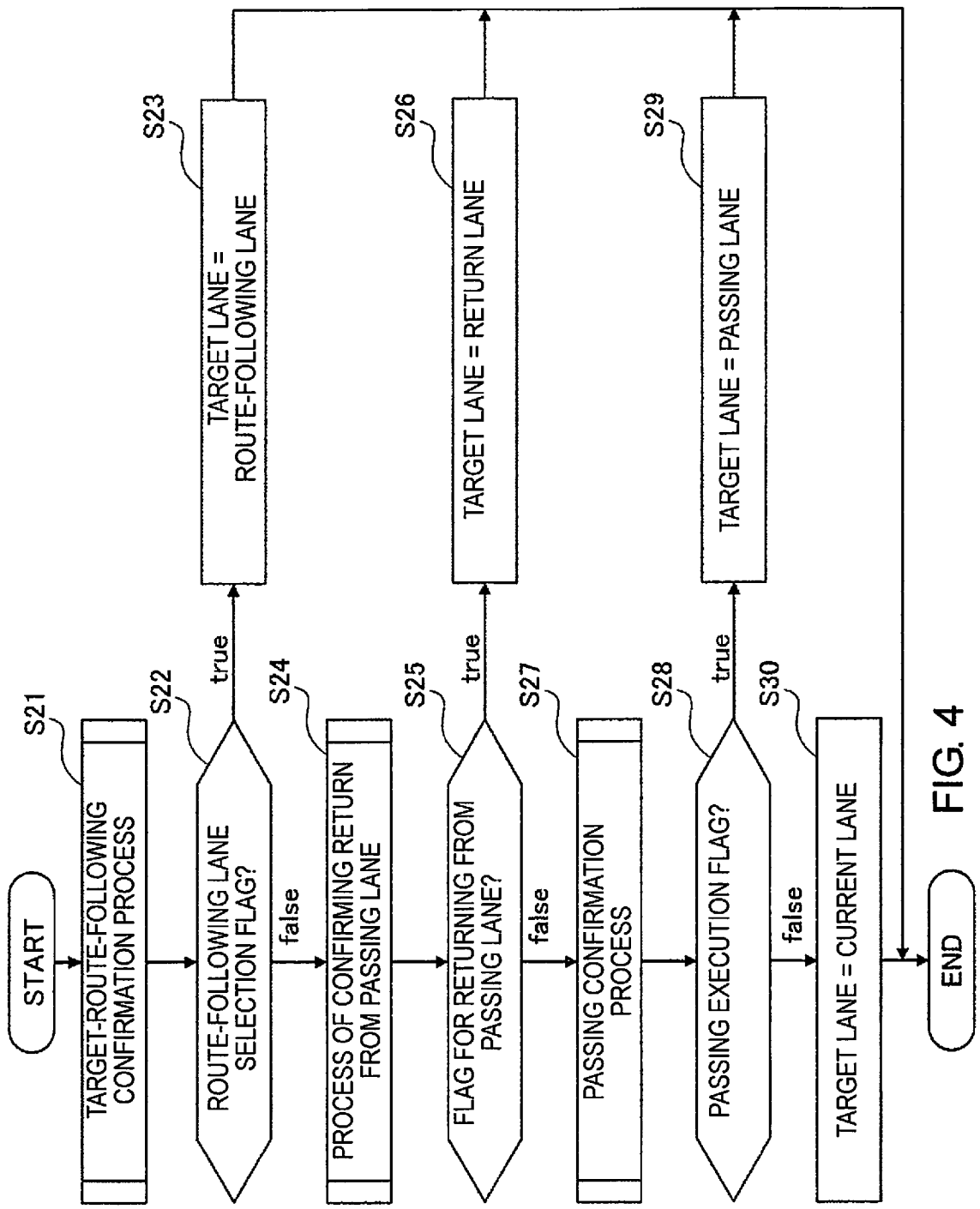
FIG. 4 is a flowchart of a flow of a basic lane selection control process executed by the vehicle-controlling ECU in the first embodiment.

FIG. 4 a flowchart showing a flow of a basic lane selection control process executed by the vehicle-controlling ECU in the first embodiment. The flow of the basic lane selection control process shown in FIG. 4 is described below.

In step S21, a target-route-following confirmation process is executed, and the process advances to step S22. In this embodiment, "target-route-following confirmation process" denotes a process of confirming whether or not the intended travel route set by the map database 14 can be followed while still traveling on the lane in which the host vehicle is currently traveling (current lane). A route-following lane selection flag and a route-following lane are set in accordance with the result of this confirmation. The details of this target-route-following confirmation process are described hereinafter.

In step S22, in continuation from the execution of the target-route-following confirmation process in step S21, the route-following lane selection flag set in the target-route-following confirmation process is determined. When the route-following lane selection flag is "true," the process advances to step S23. When the route-following lane selection flag is "false," the process advances to step S24.

In step S23, in continuation from the determination in step S22 that the route-following lane selection flag is "true," a travel control command to change lanes to the route-following lane is outputted, and the process advances to END. Travel control is thereby performed for the host vehicle so that the target lane is changed to the route-following lane set in the target-route-following confirmation process, and the current lane becomes the target lane. In this embodiment, the "route-following lane" is a lane selected in order to follow the intended travel route.

In step S24, in continuation from the determination in step S22 that the route-following lane selection flag is "false," a process of confirming a return from the passing lane is executed, and the process advances to step S25. In this embodiment, "process of confirming a return from the passing lane" denotes a process of confirming whether or not to return to the travel lane when the host vehicle is traveling in the passing lane. A flag and a lane for returning from the passing lane are set in accordance with the result of this confirmation. The details of the process of confirming a return from the passing lane are described hereinafter.

In step S25, in continuation from the execution of the process of confirming a return from the passing lane in step S24, the flag for returning from the passing lane, which was set in the process of confirming a return from the passing lane, is set. When the flag for returning from the passing lane is "true," the process advances to step S26. When the flag for returning from the passing lane is "false," the process advances to step S27.

In step S26, in continuation from the determination in step S25 that the flag for returning from the passing lane is "true," a travel control command to change lanes to a return lane is outputted, and the process advances to END. Travel control is thereby performed in the host vehicle so that the target lane is changed to the return lane set in the process of confirming a return from the passing lane, and the current lane becomes the target lane. In this embodiment, "return lane" denotes a lane selected after the forward vehicle has been passed.

In step S27, in continuation from the determination in step S25 that the flag for returning from the passing lane is "false," a passing confirmation process is executed and the process advances to step S28. In this embodiment, "passing confirmation process" denotes a process of confirming whether or not another vehicle traveling ahead of the host vehicle will be passed. A passing confirmation flag and a passing lane are set in accordance with the confirmation result. The details of this passing confirmation process are described hereinafter.

In step S28, in continuation from the execution of the passing confirmation process in step S27, a passing execution flag set in the passing confirmation process is determined. When the passing execution flag is "true," the process advances to step S29. When the passing execution flag is "false," the process advances to step S30.

In step S29, in continuation from the determination in step S28 that the passing execution flag is "true," a travel control command to change lanes to the passing lane is outputted, and the process advances to END. Travel control is thereby performed in the host vehicle so that the target lane is changed to the passing lane set in the passing confirmation process, and the current lane becomes the target lane. In this embodiment, "passing lane" denotes a lane selected when another vehicle ahead of the host vehicle is to be passed.

In step S30, in continuation from the determination in step S28 that the passing execution flag is "false," a travel control command to maintain travel on the lane in which the host vehicle is currently traveling is outputted, and the process advances to END. Due to this action, the lane in which the host vehicle is currently traveling (current lane) is set to the target lane, and travel in the current lane is continued.

Target-Route-Following Process

Figure 5:
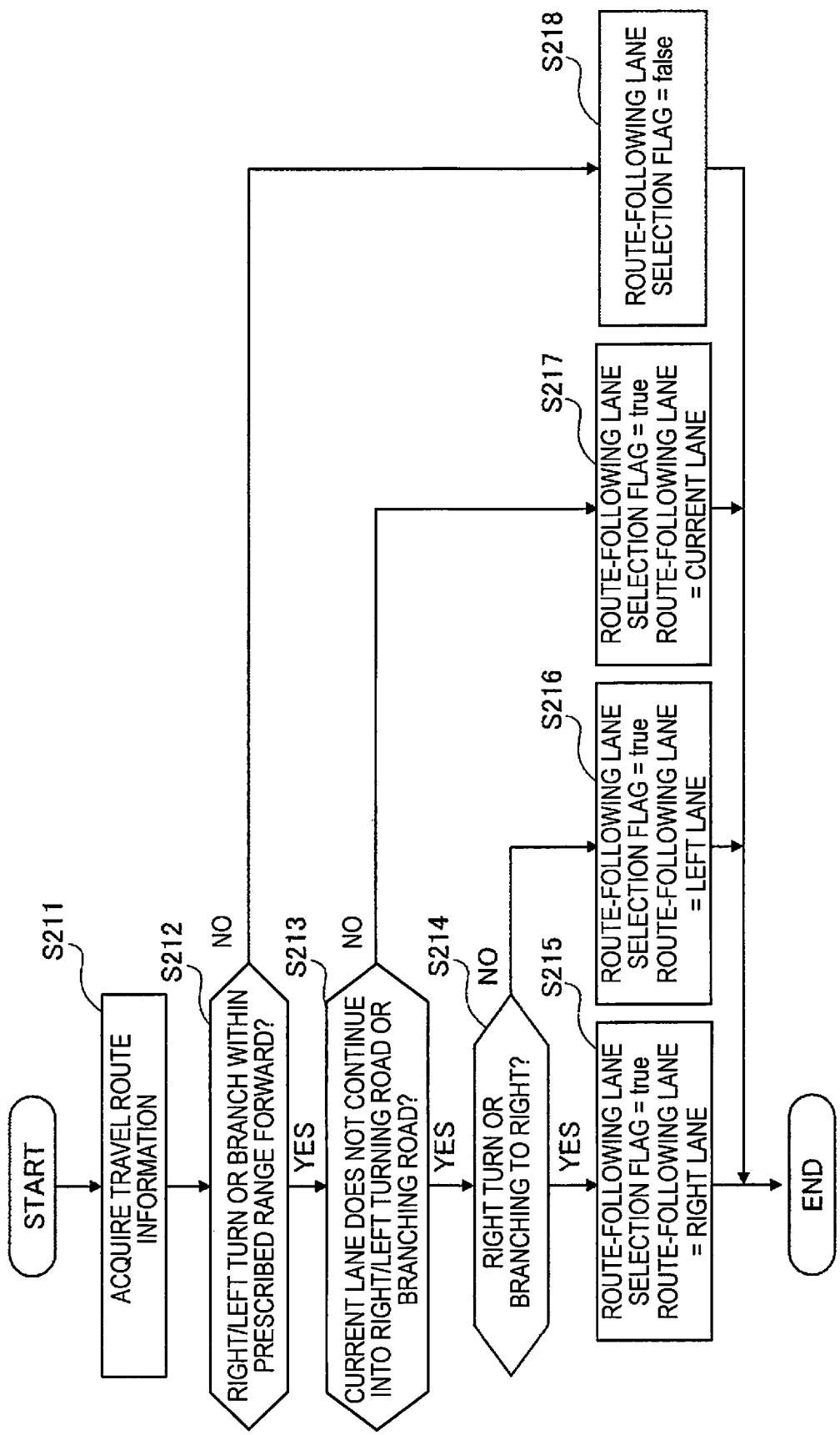
FIG. 5 is a flowchart of a flow of a target-route-following confirmation process within the basic lane selection control process.

FIG. 5 is a flowchart showing a flow of a target-route-following confirmation process within the basic lane selection control process. A target-route-following process of the first embodiment is described below based on FIG. 5.

In step S211, travel route information for the host vehicle is acquired from the navigation system 15, and the process advances to step S212.

In step S212, in continuation from the acquisition of travel route information in step S211, a determination is made as to whether or not there is any need to turn right or left or to branch to the left or right within a range up to a prescribed distance Z[m] on the intended travel route ahead of the host vehicle. When the determination is YES (there is a need for a right or left turn, etc.), the process advances to step S213. When the determination is NO (there is no need for a right or left turn, etc.), the process advances to step S218 on the premise that the intended travel route can be followed without confirming the lane. In this embodiment, "prescribed distance Z[m]" can be set as described, and is set in this embodiment to a minimum distance needed in order for the host vehicle to make a lane change.

In step S213, in continuation from the determination in step S212 that there is a need for a right or left turn, a determination is made that the lane in which the host vehicle is currently traveling (current lane) does not continue into a right/left turning road or a left/right branching road. When the determination is YES (the current lane does not continue into a right/left turning road, etc.), the process advances to step S214. When the determination is NO (the current lane does continue into a right/left turning road, etc.), the process advances to step S217.

In step S214, in continuation from the determination in step S213 that the current lane does not continue into a right/left turning road, etc., a determination is made as to whether or not the intended travel route ahead of the host vehicle turns right or branches to the right, on the premise that a right or left turn or a left or right branching cannot be appropriately made should travel in the current lane be continued, and it is not possible to follow the intended travel route. When the determination is YES (a right turn or a branching to the right), the process advances to step S215. When the determination is NO (a left turn or a branching to the left), the process advances to step S216.

In step S215, in continuation from the determination in step S214 that the intended travel route ahead of the host vehicle turns right or branches to the right, a route-following lane selection flag is set to "true," the route-following lane is set to a right lane, and the process advances to END. In this embodiment, "right lane" denotes the rightmost positioned lane in the road on which the host vehicle is traveling.

In step S216, in continuation from the determination in step S214 that the intended travel route ahead of the host vehicle turns left or branches to the left, the route-following lane selection flag is set to "true," the route-following lane is set to a left lane, and the process advances to END. In this embodiment, "left lane" denotes a leftmost positioned lane in the road on which the host vehicle is traveling.

In step S217, in continuation from the determination in step S213 that the current lane does continue into a right/left turning road, etc., on the premise that the host vehicle can turn right or left or branch to the left or right while continuing to travel in the current lane and the intended travel route can be followed, the route-following lane selection flag is set to "true," the route-following lane is set to the current lane (the lane in which the host vehicle is currently traveling), and the process advances to END.

In step S218, in continuation from the determination in step S212 that there is no need for a right or left turn, on the premise that the intended travel route can be followed while maintaining travel in the current lane, the route-following lane selection flag is set to "false" and the process advances to END. The "route-following lane" at this time is not set.

Process of Confirming Return from the Passing Lane

Figure 6:
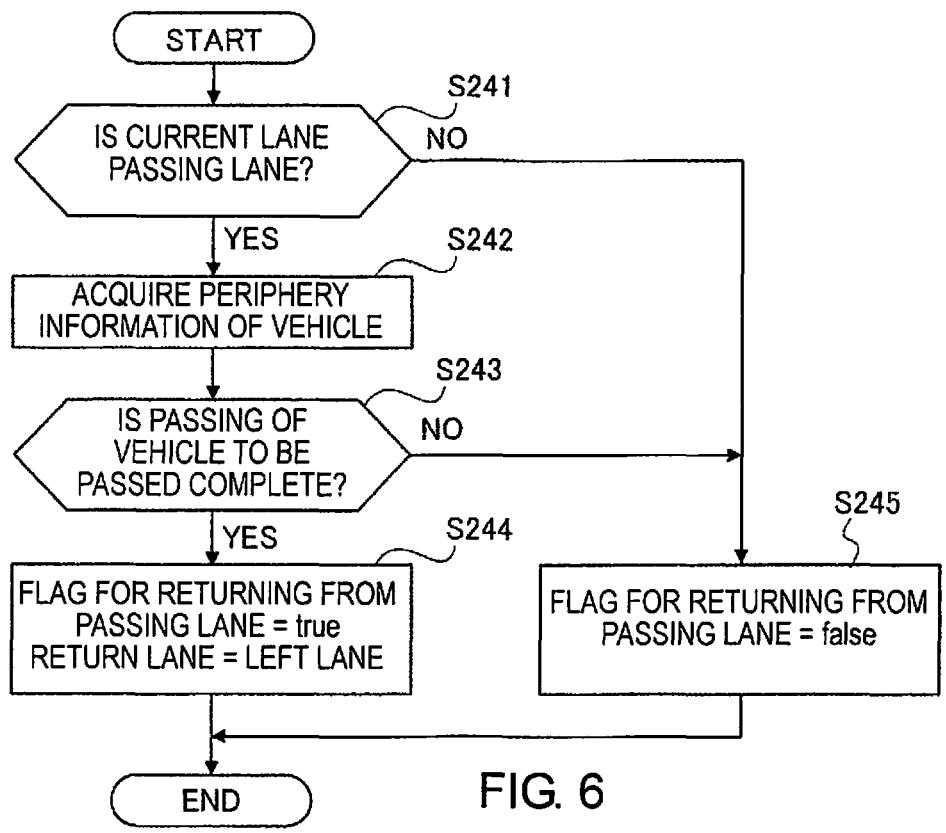
FIG. 6 is a flowchart of a flow of a process of confirming a return from the passing lane within the basic lane selection control process.

FIG. 6 is a flowchart showing a flow of a process of confirming a return from the passing lane within the basic lane selection control process. The flow of the process of confirming a return from the passing lane shown in FIG. 6 is described below.

In step S241, a determination is made as to whether or not the lane in which the host vehicle is currently traveling (current lane) is a passing lane. When the determination is YES (passing lane), the process advances to step S242. When the determination is NO (travel lane), the process advances to step S245 on the premise that a return from the passing lane is unnecessary. In this step, "passing lane" denotes a lane positioned the farthest to the right when the road on which the host vehicle is traveling includes a plurality of lanes. "Travel lane" denotes a lane other than that positioned the farthest to the right when the road on which the host vehicle is traveling includes a plurality of lanes.

In step S242, in continuation from the determination in step S241 that the current lane is the passing lane, periphery information of the host vehicle is acquired by the external sensor 11, the internal sensor 12, etc., and the process advances to step S243.

In step S243, in continuation from the acquisition of periphery information in step S242, a determination is made as to whether or not passing of the vehicle to be passed is complete. When the determination is YES (passing complete), the process advances to step S244. When the determination is NO (passing incomplete), the process advances to step S245.

In step S244, in continuation from the determination in step S243 that passing is complete, the flag for returning from the passing lane is set to "true," the return lane is set to the left lane, and the process advances to END. In this embodiment, "left lane" denotes the lane adjacent to the left side of the lane in which the host vehicle is currently traveling (passing lane).

In step S245, in continuation from the determination of the travel lane in step S241 or the determination that passing is incomplete in step S243, the flag for returning from the passing lane is set to "false" and the process advances to END, on the premise that travel in the lane in which the host vehicle is currently traveling (the current lane) can be maintained. A "return lane" is not set at this time.

Passing Confirmation Process

Figure 7:
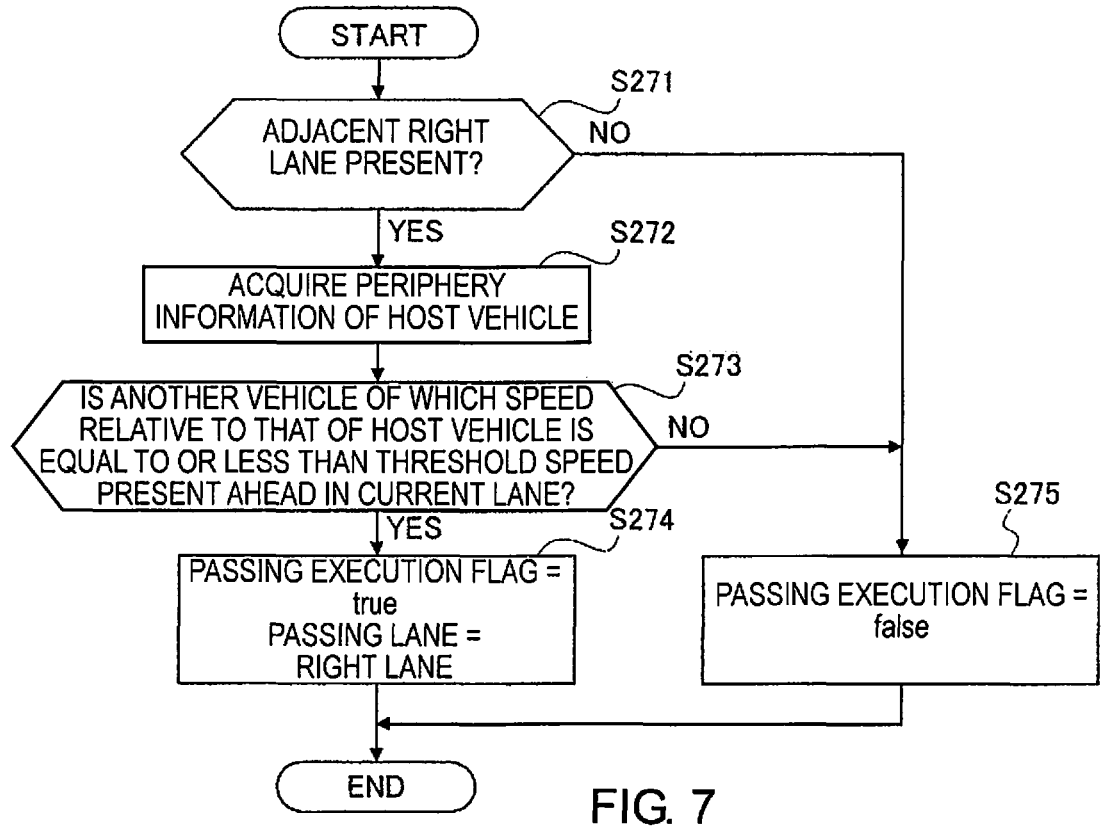
FIG. 7 is a flowchart of a flow of a passing confirmation process within the basic lane selection control process.

FIG. 7 is a flowchart showing a flow of the passing confirmation process within the basic lane selection control process. The passing confirmation process of the first embodiment is described below based on FIG. 7.

In step S271, a determination is made as to whether or not a right lane is present, adjacent to the right side of the lane in which the host vehicle is currently traveling (current lane). When the determination is YES (there is a right lane), the process advances to step S272. When the determination is NO (there is not a right lane), the process advances to step S275 on the premise that a passing action is not possible.

In step S272, in continuation from the determination in step S271 that there is a right lane, periphery information of the host vehicle is acquired by the external sensor 11, the internal sensor 12, etc., and the process advances to step S273.

In step S273, in continuation from the acquisition of the periphery information in step S272, a determination is made as to whether or not ahead in the lane in which the host vehicle is currently traveling (current lane), there is another vehicle of which the speed relative to that of the host vehicle is equal to or less than a threshold speed. When the determination is YES (there is another vehicle of which the relative speed is equal to or less than the threshold speed), the process advances to step S274. When the determination is NO (there is not another vehicle of which the relative speed is equal to or less than the threshold speed), the process advances to step S275 on the premise that there is no need for a passing action.

In step S274, in continuation from the determination in step S273 that there is another vehicle of which the relative speed is equal to or less than the threshold speed, on the premise that the other vehicle ahead can be passed, the passing execution flag is set to "true," the passing lane is set to the right lane, and the process advances to END. In this embodiment, "right lane" denotes a lane adjacent to the right side of the lane in which the host vehicle is currently traveling (current lane).

In step S275, in continuation from the determination in step S271 that there is not a right lane, or the determination in step S273 that there is not another vehicle of which the relative speed is equal to or less than the threshold speed, the passing execution flag is set to "false" and the process advances to END on the premise that passing will not be executed. A "passing lane" is not set at this time.

Next, the actions shall be described. First, the necessity of a correction of the self-position on the map and the problems therewith shall be described, and the actions of the method and self-position correction device for a drive-assisted vehicle shall then be described, this description being divided into a "lane selection action" and "other characteristic actions."

Necessity of the Self-Position Correction on Map and Problems Therewith

To appropriately control drive-assisted vehicle, such as a vehicle for which route guidance can be given using a navigation system or an autonomously driven vehicle in which the accelerator pedal, the brake, the steering wheel, etc., are autonomously controlled to make autonomous driving possible, it is vital to accurately ascertain the position of the host vehicle on the map (the self-position).

One example of a technology for ascertaining a self-position is a global navigation satellite system (GNSS), which uses satellites such as those of a global positioning system (GPS). However, in a GNSS, error is minimized by receiving a plurality of signals generated by the satellites, but it is difficult to be constantly receiving signals appropriately, and the associated precision is insufficient.

In view of this, there is a known technology in which a recognition result for a self-position correction object (a white line having a point of changing curvature, a sign, etc.) obtained from a stereo camera or another onboard sensor and a self-position correction object in map data stored in advance are matched, and the self-position on the map is corrected. Specifically, this is a method in which, for example, when a host vehicle travels through a curve, an actual travel position calculated form an actual self-position through which the host vehicle actually traveled and a hypothetical travel position calculated from an estimated self-position are compared, and from an amount of deviation therebetween, the estimated self-position is corrected.

In this case, when a self-position correction object could be appropriately recognized in cases such as when a white line recognized by the onboard sensor curves and there is a point of change in the curvature, or a sign could be recognized, self-position correction can be performed because the matching with the map data can be uniquely fixed. However, when a self-position correction object could not be appropriately recognized in cases such as when a white line recognized by the onboard sensor is a straight line with no point of change in the curvature, or a sign could not be recognized, a problem is encountered in that the map data and the self-position correction object cannot be matched and self-position correction cannot be performed.

Self-position correction objects are recognized by an onboard sensor installed in the host vehicle, but there is a limit to the range of recognition of this onboard sensor. Therefore, even if, for example, there is a self-position correction object in a position in proximity to the host vehicle, when this object is outside of the range of recognition of the onboard sensor, the self-position correction object cannot be appropriately recognized. As a result, a problem is encountered in that a correction to the position of the host vehicle cannot be performed and the correction opportunity is lost.

Such a self-position correction must be performed regularly. Specifically, when position correction by matching between the map data and a self-position correction object recognized by a sensor, such as is described above, is not possible, the self-position is estimated (dead reckoning) using the vehicle speed or yaw rate detected by the onboard sensor, but there will be measurement error in the value detected by the onboard sensor. Therefore, position deviation due to measurement error occurs in dead reckoning. This is because as dead reckoning is continued, deviation (error) between the actual vehicle position and the map data accumulates and the deviation from the accurate position increases.

Thus, to accurately ascertain the position of the host vehicle on the map, periodic self-position corrections are necessary, but if a self-position correction object cannot be appropriately recognized, the self-position correction control process cannot be performed. Additionally, there is a limit to the range of recognition of the onboard sensor, and when the self-position correction object is outside of the range of recognition of the onboard sensor, there is a problem in that the object cannot be appropriately recognized and the correction opportunity is lost.

Lane Selection Action

Figure 8:
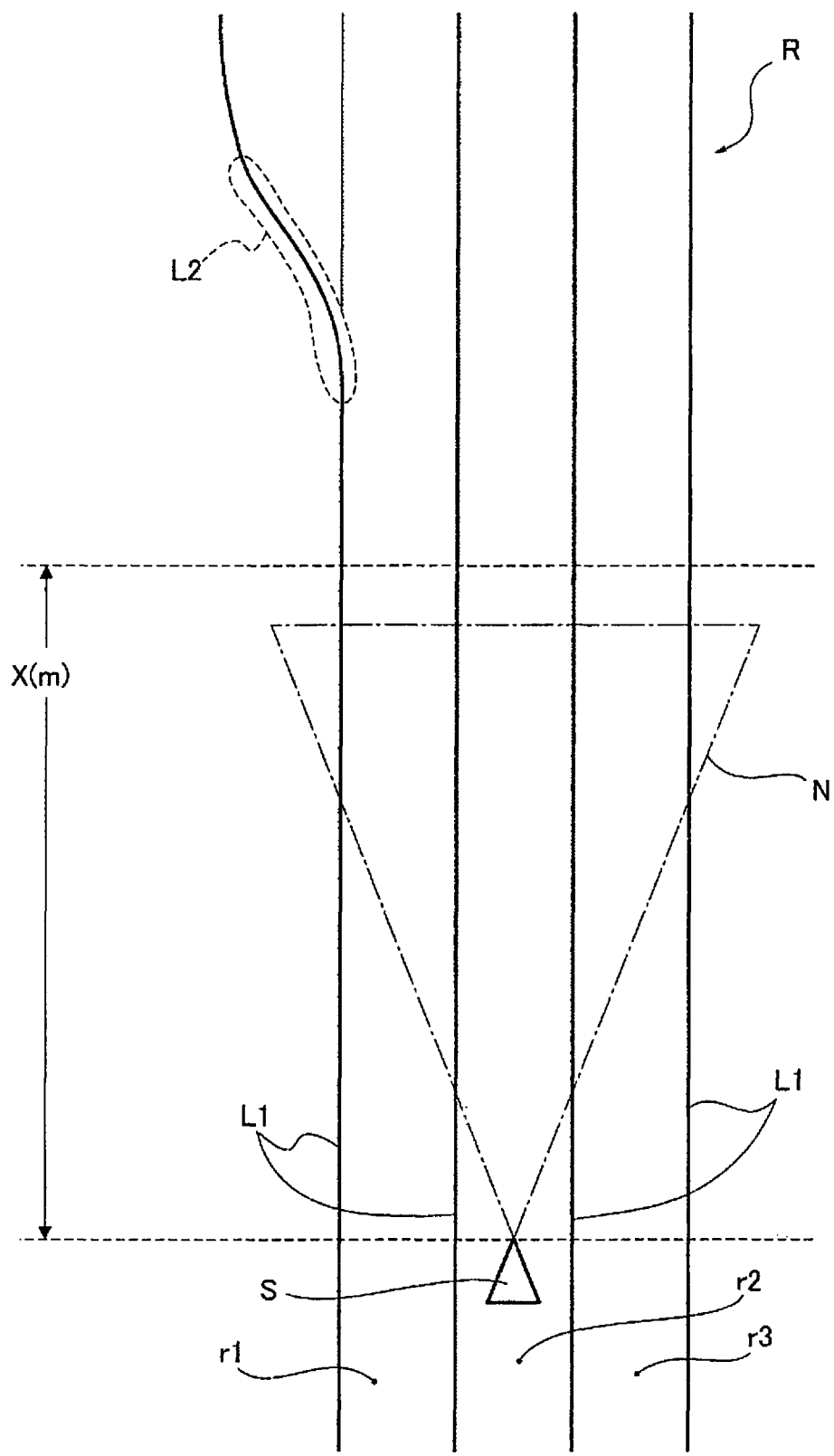
FIG. 8 is drawing of a traveling situation of a vehicle prior to a self-position correction.
Figure 9:
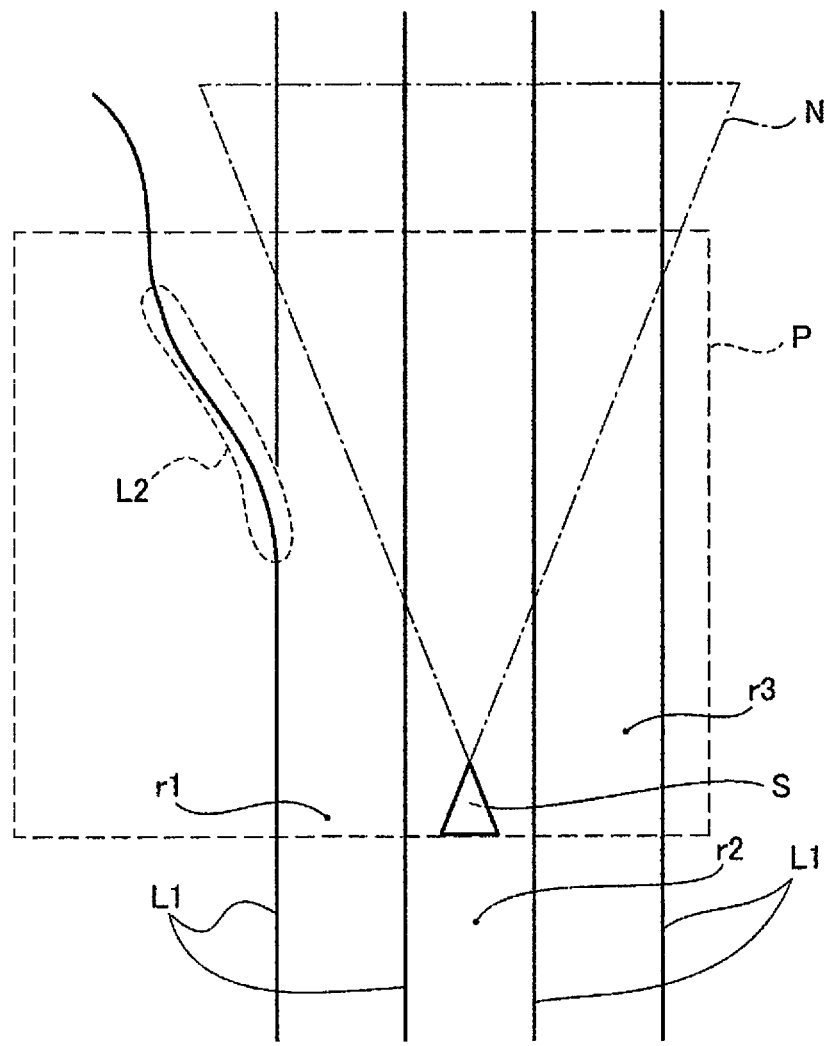
FIG. 9 is an explanatory diagram of a range of recognition by an external sensor when travel in a center lane continues.
Figure 10:
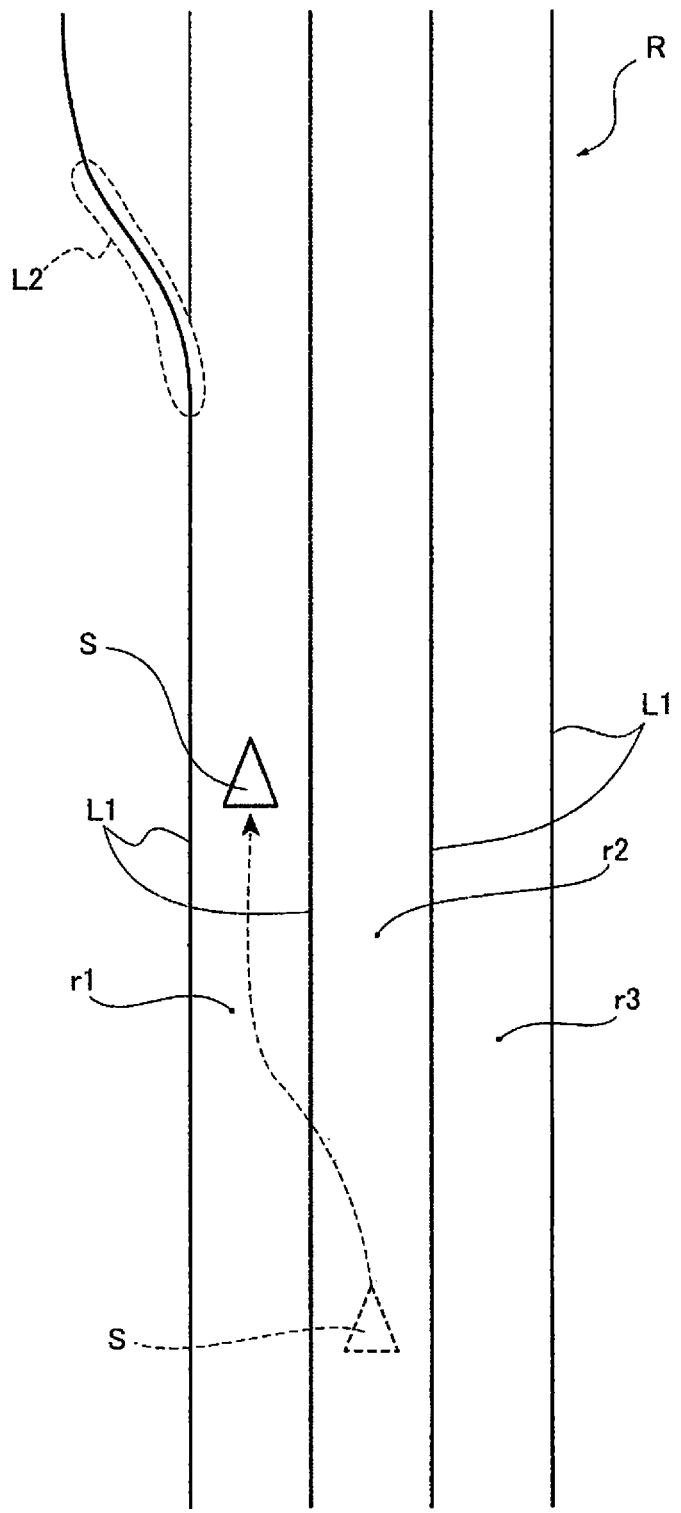
FIG. 10 is an explanatory diagram of a traveling situation of a vehicle after a lane change.
Figure 11:
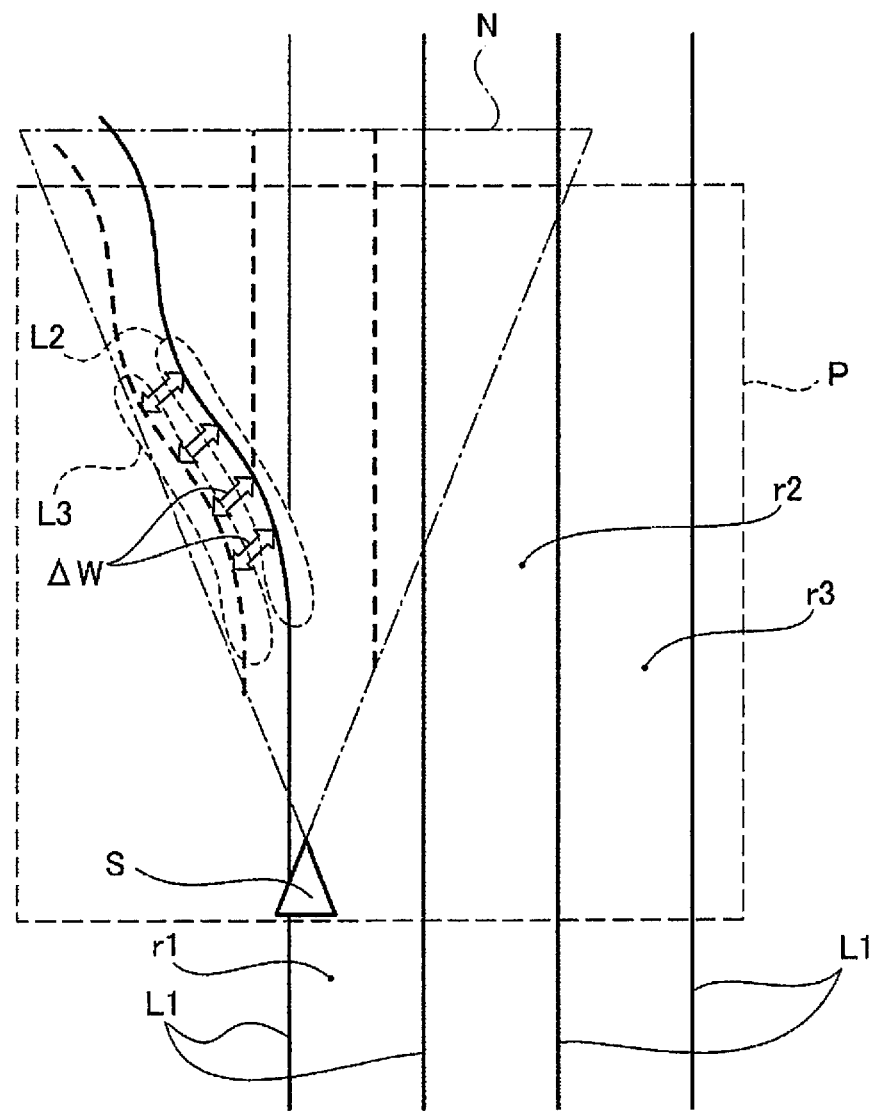
FIG. 11 is an explanatory diagram of a range of recognition by an external sensor during travel in a leftmost lane.

FIG. 8 is a diagram of a traveling situation of a vehicle prior to a self-position correction, FIG. 9 is a diagram of a range of recognition of an external sensor when travel in a center lane continues, FIG. 10 is a diagram of a traveling situation of a vehicle after a lane change, and FIG. 11 is a diagram of a range of recognition of an external sensor during travel in a leftmost lane. A lane selection action of the first embodiment shall be described below using FIGS. 8 to 11.

As shown in FIG. 8, a case is considered in which a drive-assisted vehicle (referred to below as a "host vehicle S") capable of autonomous driving, to which the self-position correction method of the first embodiment is applied, is traveling in a center lane r2 of a road R with three lanes on each side. At this time, the position of the host vehicle S on the map is defined relative to white lines L1 based on map information in the map database 14.

As shown in FIG. 8, as a situation in which the host vehicle travels in the center lane r2 of the road R with three lanes on each side, for example, while merging into this road R from the left side and traveling in the leftmost lane r1, the host vehicle makes a lane change to the center lane r2 in order to pass a low-speed vehicle ahead. In the situation considered, the intended travel route thereafter follows the road, and the host vehicle therefore continues to travel in the center lane r2 without making a lane change back to the original lane (the leftmost lane r1) in order to avoid unnecessary lane changes.

When the self-position-uncorrected distance, which is the distance traveled after the most recent self-position correction, exceeds a threshold distance D[km] while the host vehicle S is thus traveling in the center lane r2, the process advances from step S1 to step S2 shown in FIG. 2. A determination is made as to whether or not a self-position correction object, which can be recognized even when travel is maintained in the center lane r2, which is the current lane the host vehicle S is currently traveling in, is present within a range extending up to a prescribed distance X[m] in the intended travel route ahead of the host vehicle S.

In this embodiment, the "self-position correction object" is a white line L2 having a point of changing curvature in the case shown in FIG. 8. In the case of a straight white line, positional deviation in a vehicle-lateral direction can be corrected, but positional deviation in a vehicle-longitudinal direction cannot be corrected, and a straight white line therefore cannot be a self-position correction object. In the host vehicle S, there is a limit to a range N that can be recognized by the external sensor 11, and this range of recognition N is the range encircled by a single-dashed line (a range in which a total of four white lines can be photographed, at maximum two each on the left and right with the host vehicle S in the center) in FIG. 8. Therefore, in the state shown in FIG. 8, the self-position correction object (the white line L2) cannot be recognized from the center lane r2, which is the current lane, and it is determined that within the range extending up to the prescribed distance X[m] in the intended travel route ahead of the host vehicle S, there is not a self-position correction object (white line L2) that can be recognized even if travel in the current lane (the center lane r2) is maintained. However, there actually is a self-position correction object (white line L2) in the intended travel route.

In view of this, the process advances from step S2, to step S4, to step S5, a self-position correction object (white line L2) in the intended travel route is identified, and at a time point when a correction point P is reached, a determination is made as to whether or not the self-position correction object (white line L2) can be recognized from the current lane (the center lane r2).

However, in a case in which travel in the center lane r2 is continued, even when the host vehicle S has reached the correction point P as shown in FIG. 9, the self-position correction object (white line L2) is outside of the range of recognition N of the external sensor 11 and cannot be recognized. Therefore, the process advances from step S5, to step S7, to step S8. A notification control command is thereby outputted, and when the driver has been notified that a lane change will be made to a lane (the leftmost lane r1 in the case of FIG. 8) from which the self-position correction object (white line L2) can be recognized, a travel control command is outputted to make a lane change to the lane (leftmost lane r1) from which the self-position correction object (white line L2) can be recognized before the correction point P is reached.

As a result, a travel control command is inputted to the drive actuator 31, which drives the accelerator pedal, the brake, and the steering wheel, the accelerator pedal, etc., is autonomously controlled, and as shown in FIG. 10, a lane change is made to the leftmost lane r1 before the correction point P is reached. When the host vehicle S has reached the correction point P as shown in FIG. 11, it is thereby possible for the self-position correction object (white line L2) to be included within the range of recognition N of the external sensor 11, and the self-position correction object (white line L2) can be appropriately recognized.

The self-position correction control process of step S10 is then executed. Specifically, in the flowchart shown in FIG. 3, a determination is made via step S11 as to whether or not the host vehicle S has reached the correction point P. As shown in FIG. 11, the process advances to step S12 if the correction point P has been reached, a determination is made as to whether or not the self-position correction object (white line L2) has been recognized, and if so, the process advances to step S13.

The white line L2 (first self-position correction object) based on the map information shown by solid lines in FIG. 11 and a white line L3 (second self-position correction object) based on the image information photographed by the external sensor 11 and shown by dashed lines in FIG. 11 are then matched. If matching is successful, the process advances from step S14 to step S15, and based on a position deviation amount ΔW, the position of the host vehicle S on the map is corrected so that the position deviation amount ΔW is zero. Therefore, the position of the host vehicle S on the map can be appropriately corrected.

The process then advances from step S16 to step S18, the self-position-uncorrected distance is set to zero, the most recent correction time is updated to the current time, and the basic lane selection control process is executed. Travel then continues with the appropriate lane selected while instances of unnecessary lane changes are minimized in accordance with, inter alia, environment information on the vehicle periphery after the position correction, the intended travel route, and the speeds of forward vehicles.

Thus, in the first embodiment, there is a self-position correction object (white line L2) ahead of the travel path of the host vehicle S, but when travel in the current lane (the center lane r2) is continued and this self-position correction object (white line L2) is outside of the range of recognition N of the external sensor 11, a lane change is made to a lane (the leftmost lane r1) from which the self-position correction object (white line L2) can be recognized before the correction point P is reached. Thereafter, when the self-position correction object (white line L2) is successfully recognized, the position of the host vehicle S on the map is corrected. In other words, even when the self-position correction object (white line L2) cannot be recognized from the current lane (the center lane r2), the host vehicle is actively moved to a lane (the leftmost lane r1) in which the self-position can be corrected, whereby position correction of the host vehicle S is made possible and opportunities for self-position correction can be increased.

In the first embodiment, when the self-position-uncorrected distance exceeds the pre-set threshold distance D[km], travel lane selection control (the process of step S4 to step S8 shown in FIG. 2) is executed. In other words, this travel lane selection control (the process of step S4 to step S8 shown in FIG. 2) is executed when a correction to the position of the host vehicle S on the map cannot be carried out within a pre-set prescribed interval (every time the threshold distance D[km] is traveled).

Due to this configuration, a lane change for including the self-position correction object in the range of recognition N of the external sensor 11 is not performed when the position of the host vehicle S can be corrected in an appropriate interval, and is executed when it is determined that error in the estimation of the host vehicle S position, which is estimated based on vehicle speed and yaw rate, exceeds a prescribed value. Therefore, opportunities to correct the self-position can be increased while occurrences of unnecessary lane changes are minimized.

Other Characteristic Actions

In the first embodiment, when, within the range extending to the prescribed distance X[m] in the intended travel route ahead of the host vehicle S, there is a self-position correction object (white line L2) that can be recognized while travel in the current lane (the center lane r2) is maintained, in the flowchart shown in FIG. 2, the process advances from step S2 to step S3. Specifically, lane selection control (the process of step S4 to step S8 shown in FIG. 2) is executed when, within the range extending to the prescribed distance X[m] in the intended travel route ahead of the host vehicle S, there is not a self-position correction object (white line L2) that can be recognized while travel in the current lane (the center lane r2) is maintained.

Due to this configuration, when it is understood that within the range extending to the prescribed distance X[m] ahead of the host vehicle S, there is a self-position correction object (white line L2) that can be recognized while travel in the current lane (the center lane r2) is maintained, lane selection control (the process of step S4 to step S8 shown in FIG. 2) is not executed, the carrying out of a lane change is restricted, and travel in the current lane (the center lane r2) is continued. Therefore, even when a self-position correction object that can be recognized if a lane change is made is present within the prescribed distance X[m] from the host vehicle position, lane changes for recognizing the self-position correction object are restricted, and the frequency of lane change occurrences can be minimized.

Furthermore, lane changes for passing, etc., can be restricted and decreases in correction opportunities can be prevented. In other words, in cases in which a lane change has been made along with a pass, etc., regardless of the fact that, for example, within the prescribed distance X[m] ahead of the host vehicle S, there is a self-position correction object that can be recognized from the current lane, the current lane is changed due to the lane change for this pass, and as a result, the self-position correction object will sometimes cease to be recognizable. In such an instance, a lane change for recognizing the self-position correction object might be necessary. Depending on the position of the self-position correction object, the lane change for recognizing the self-position correction object might not be made in time, and the correction opportunity might be lost.

By contrast, when, within the prescribed distance X[m] ahead of the host vehicle S, there is a self-position correction object that can be recognized while travel in the current lane (the center lane r2) is maintained, the carrying out of a lane change is restricted, whereby the self-position correction object can be appropriately recognized without making a lane change. Due to this configuration, a correction to the host vehicle S position can be reliably carried out while occurrences of unnecessary lane changes are minimized, and decreases in correction opportunities can be prevented.

Furthermore, in the first embodiment, when a lane change is carried out in order to recognize a self-position correction object as shown in FIG. 2, a notification control command is outputted before the lane change is made, and the driver is notified that a lane change will be made to a lane from which the self-position correction object can be recognized.

Therefore, even when a change to the lane in which the host vehicle S is traveling is autonomously carried out, the driver can ascertain the reason for the lane change, and the driver's unease can be resolved.

Next, effects shall be described. The effects presented below are achieved with the self-position correction method and the self-position correction device for a drive-assisted vehicle of the first embodiment.

(1) A self-position correction method for a drive-assisted vehicle comprising an onboard sensor (external sensor 11) that acquires information about a periphery of a host vehicle S, and a controller (vehicle-controlling ECU 20) that selects a lane in which the host vehicle S travels based on information acquired by the onboard sensor (external sensor 11) and map information and corrects a self-position on a map, wherein:

identifying a self-position correction object (white line L2) in an intended travel route based on the map information (step S4) during in lane selection control in which the lane in which the host vehicle S travels is selected (steps S4 to step S8); determining whether or not the self-position correction object (white line L2) can be recognized by the onboard sensor (external sensor 11) from the lane (center lane r2) in which the host vehicle S reaches a correction point P where the identified self-position correction object (white line L2) is present (step S5); and making a lane change to a lane (leftmost lane r1) where the self-position correction object (white line L2) can be recognized is made before the host vehicle S reaches the correction point P (step S8) upon determining that the self-position correction object (white line L2) cannot be recognized from the lane (center lane r2) in which the host vehicle S travels.

Due to this configuration, the host vehicle S can be actively moved to a position (leftmost lane r1) where the self-position correction object (white line L2) can be recognized, and the number of opportunities to correct the self-position on the map can be increased.

(2) The lane selection control (step S4 to step S8) is executed when a correction of the self-position on the map cannot be carried out in a prescribed interval (threshold distance D[km]) that has been set in advance (step S1). In addition to the effect of (1), it is thereby possible to increase the number of opportunities to correct the self-position while minimizing instances of unnecessary lane changes.

(3) The lane selection control (step S4 to step S8) is executed when a self-position correction object (white line L2) that can be recognized is not present in a prescribed distance X[m] ahead of the host vehicle S, even if travel by the host vehicle S in the lane currently traveled in (center lane r2) is maintained (step S2). In addition to the effect of (1) or (2), it is thereby possible to increase the number of opportunities to correct the self-position while minimizing instances of unnecessary lane changes.

(4) The controller (vehicle-controlling ECU 20) autonomously carries out a change of the lane in which the host vehicle S travels, and when a lane change to a lane where the self-position correction object (white line L2) can be recognized is carried out, a driver is notified that the lane change will be carried out (step S7). In addition to any of the effects of (1) to (3), it is thereby possible to alleviate the driver's discomfort with an autonomously carried out lane change.

(5) A device for correcting a self-position of a drive-assisted vehicle comprising an onboard sensor (external sensor 11) that acquires information about a periphery of a host vehicle S, and a controller (vehicle-controlling ECU 20) that selects a lane in which the host vehicle S travels based on information acquired by the onboard sensor (external sensor 11) and map information, and corrects the self-position on a map, wherein the controller (vehicle-controlling ECU 20) comprises:

a correction object identification unit 23 that identifies a self-position correction object (white line L2) in an intended travel route based on the map information;

a correction object recognition determination unit 24 that determines whether or not the self-position correction object (white line L2) identified by the correction object identification unit 23 can be recognized by the onboard sensor (external sensor 11) from a lane in which the host vehicle S travels (center lane r2) when the host vehicle S reaches a correction point P where the self-position correction object (white line L2) is present; and a lane selection unit 25 that, when the correction object recognition determination unit 24 has determined that the self-position correction object (white line L2) cannot be recognized from the lane in which the host vehicle S travels (center lane r2), changes lanes, before the host vehicle S reaches the correction point P, to a lane (leftmost lane r1) where the self-position correction object (white line L2) can be recognized.

Due to this configuration, the host vehicle S can be actively moved to a position (leftmost lane r1) where the self-position correction object (white line L2) can be recognized, and the number of opportunities to correct the self-position on the map can be increased.

The self-position correction method and the self-position correction device for a drive-assisted vehicle of the present invention were described above based on the first embodiment, but this example is not provided by way of limitation on the specific configuration; modifications, additions, and other changes to the design are allowed as long as there is no departure from the scope of the invention as in the claims.

In the first embodiment, an example was presented in which, when it is determined that a self-position correction object could not be recognized if travel in the current lane were to continue, a travel control command to change lanes to a lane where the self-position correction object can be recognized is outputted, and the accelerator pedal, etc., is autonomously controlled to perform a lane change. In other words, in the first embodiment, an example was presented in which "drive-assisted vehicle" denotes an autonomously driven vehicle that autonomously executes a lane change based on a command from a controller, and "changing lane" denotes that a lane change is performed based on a command from the controller without any driving operation by the driver.

However, this example is not provided by way of limitation. The method and device for self-position correction of the first embodiment can be applied even to a manually operated vehicle in which lane changes are performed by driving operations on the part of the driver. In this case, when it is determined that a self-position correction object could not be recognized if travel in the current lane were to continue, the driver is prompted to make a lane change by a textual representation from an onboard display, an output of sound from a speaker, a blinking light from an onboard lamp, etc. Thus, "changing lane" may be performed by assisting a lane change to a lane where the self-position correction object can be recognized.

In the first embodiment, an example was presented in which lane selection control (the process of step S4 to step S8 shown in FIG. 2) is executed when a self-position-uncorrected distance exceeds a threshold distance D[km], and a lane change is carried out as necessary. However, this example is not provided by way of limitation in regard to the timing at which lane selection control (the process of step S4 to step S8 shown in FIG. 2) is executed. For example, when a lane is set along the intended travel route, lane selection control (the process of step S4 to step S8 shown in FIG. 2) may be executed so that position correction for the host vehicle S can be performed periodically. In this case, first, an intended travel route is read, and a self-position correction object present in the intended travel route is identified based on map information. Next, a reference lane (e.g., the center lane of the three lanes on one side, etc.) running along the intended travel route is set. A determination is made as to whether the self-position correction object can be recognized from this reference lane, and based on this determination result, a suitable lane is selected so that the host vehicle is guided to a lane where periodic self-position corrections can be made.

Furthermore, in the first embodiment, an example was presented in which the driver is notified of a lane change by sound from a speaker before a lane change for recognizing a self-position correction object is made, but this example is not provided by way of limitation. For example, the driver may be notified by a textual representation from an onboard display, a blinking light from an onboard lamp, etc. The driver also need not be notified.

Additionally, in the first embodiment, an example was presented in which lane selection control (the process of step S4 to step S8 shown in FIG. 2) is executed using a self-position-uncorrected distance as a reference, but this example is not provided by way of limitation. For example, lane selection control (the process of step S4 to step S8 shown in FIG. 2) may be executed using a period of time over which correction is not performed as a reference. Specifically, lane selection control may be executed when self-position correction is not performed during a prescribed period of time.

Additionally, in the first embodiment, an example was presented in which a white line having a point of changing curvature is designated as a self-position correction object, but this example is not provided by way of limitation. For example, the self-position correction object may be a sign, a building on the road, etc. The object is preferably something that can be recognized by the external sensor 11 and identified from map information.

The invention claimed is:

1. A self-position correction method for a drive-assisted vehicle comprising an onboard sensor that acquires information about a periphery of a host vehicle, and a controller that selects a lane in which the host vehicle travels based on information acquired by the onboard sensor and map information and corrects a self-position on a map,
the self-position correction method comprising:
identifying a self-position correction object in an intended travel route based on the map information during in a lane selection control in which the lane in which the host vehicle travels is selected;
in continuation from the identification of the self-position correction object, determining, before the host vehicle reaches a correction point as to whether or not the self-position correction object can be recognized by the onboard sensor from the lane in which the host vehicle travels at a timepoint when the host vehicle reaches the correction point where the identified self-position correction object is present; and
making a lane change to a lane where the self-position correction object can be recognized before the host vehicle reaches the correction point upon determining that the self-position correction object cannot be recognized from the lane in which the host vehicle travels.

2. The self-position correction method according to claim 1, wherein
the lane selection control is executed when a correction of the self-position on the map cannot be carried out in a prescribed interval that has been set in advance.

3. The self-position correction method according to claim 2, wherein
the lane selection control is executed when a self-position correction object that can be recognized is not present in a prescribed distance ahead of the host vehicle, even if travel by the host vehicle in the lane currently traveled in is maintained.

4. The self-position correction method according to claim 2, wherein
the controller autonomously carries out a change of the lane in which the host vehicle travels, and
notifying a driver that the lane change will be carried out when the lane change to the lane where the self-position correction object can be recognized is carried out.

5. The self-position correction method according to claim 1, wherein
the lane selection control is executed when a self-position correction object that can be recognized is not present in a prescribed distance ahead of the host vehicle, even if travel by the host vehicle in the lane currently traveled in is maintained.

6. The self-position correction method according to claim 5, wherein
the controller autonomously carries out a change of the lane in which the host vehicle travels, and
notifying a driver that the lane change will be carried out when the lane change to the lane where the self-position correction object can be recognized is carried out.

7. The self-position correction method according to claim 1, wherein
the controller autonomously carries out a change of the lane in which the host vehicle travels, and
notifying a driver that the lane change will be carried out when the lane change to the lane where the self-position correction object can be recognized is carried out.

8. A self-position correction device for a drive-assisted vehicle, the self-position correction device comprising:
an onboard sensor that acquires information about a periphery of a host vehicle; and
a controller that selects a lane in which the host vehicle travels based on information acquired by the onboard sensor and map information, and corrects a self-position on a map,
the controller comprising:
a correction object identification unit that identifies a self-position correction object in an intended travel route based on the map information;
a correction object recognition determination unit that, before the host vehicle reaches a correction point where the self-position correction object is identified by the correction object identification unit as being present, determines whether or not the self-position correction object identified by the correction object identification unit can be recognized by the onboard sensor from a lane in which the host vehicle travels at a timepoint when the host vehicle reaches the correction point where the self-position correction object is present; and
a lane selection unit that, when the correction object recognition determination unit has determined that the self-position correction object cannot be recognized from the lane in which the host vehicle travels, changes lanes, before the host vehicle reaches the correction point, to a lane where the self-position correction object can be recognized.

\* \* \* \* \*